United States Patent Office 3,441,614
Patented Apr. 29, 1969

3,441,614
PROCESS FOR THE PRODUCTION OF
β-CHLOROORGANOSULFONES
Meir Asscher and David Vofsi, Rehovoth, and Aharon Katchalsky, Tel-Aviv, Israel, assignors to Yeda Research and Development Co. Ltd., Rehovoth, Israel, a corporation of Israel
No Drawing. Filed Oct. 19, 1964, Ser. No. 404,974
Claims priority, application Israel, Oct. 21, 1963, 20,106
Int. Cl. C07c *147/06;* C07d *51/16, 55/00*
U.S. Cl. 260—607
14 Claims

ABSTRACT OF THE DISCLOSURE

A process for the production of adducts of organic sulfonyl chlorides and olefinic compounds in the presence of catalytic amounts of iron or copper compounds. Additional chloride salts may also advantageously be added to the reaction medium.

---

It is an object of the present invention to provide a novel process for the preparation of adducts of alkenes, alkadienes and aromatic mono- and diolefins with substituted or unsubstituted aliphatic, aromatic or heterocyclic mono- and di-sulfonyl chlorides. More particularly, the invention relates to the preparation of compounds of the general formula $RSO_2CH(R').C(Cl)R''R'''$, where R designates alkyl, substituted alkyl, aryl, substituted aryl or a heterocyclic radical, R' designates hydrogen or alkyl, or forms together with R'' a cyclic system, and R'' and R''' each designate hydrogen, alkyl, substituted alkyl, halogen, cyano, carboxyalkyl, acyloxy, aryl, or substituted aryl, or form together a cyclic system; of the general formula $R[SO_2CHR'.C(Cl)R''R''']_2$, where R designates a bivalent aliphatic or aromatic radical and R', R'' and R''' are defined as for the first general formula; of the general formula $RSO_2CH_2.CR':CR''.CH_2Cl$, where R is defined as for the first general formula, and R' and R'' each designate hydrogen, halogen, or alkyl; of the general formula $R(SO_2CH_2.CR':CR''.CH_2Cl)_2$, where R designates a bivalent aliphatic or aromatic radical, and R' and R'' are defined as for the preceding general formula; and of the general formula $$[RSO_2CHR'.C(Cl)R'']_2R'''$$

where R is defined as for the first general formula, R' designates hydrogen or alkyl, R'' designates hydrogen, alkyl or halogen, and R''' designates a bivalent aliphatic or aromatic radical.

The novel process provides a general method for the preparation of beta-chlorosulfones (also known as β-chloroorganosulfones). Beta-chlorosulfones can be easily dehydrohalogenated, to give alpha-beta-unsaturated sulfones, which become easily accessible by the present method.

Beta-chlorosulfones are of interest as pesticides, and also a intermediates for the manufacture of alpha-beta-unsaturated sulfones, which are known as bactericidic and fungicidical compounds. Vinyl-sulfones are well-known monomers and reactive dye-intermediates. They are easily obtained from beta-chloroethylsulfones, which hitherto had to be made by a more complicated synthesis.

The addition of sulfonyl chloride to olefins has been described only for some special cases (N-chlorosulfnyl-phthalimide to octene-1, Kharasch and Mosher, J. Am. Chem. Soc. 1952, 17, 453; p-chlorobenzene-sulfonyl chloride to ethylene, giving both 1:1 adduct and telomers: Ladd, U.S. Patent 2,573,580, of Oct. 30, 1951. Benzene sulfonyl chloride is reported to be less reactive, and alkyl sulfonyl chloride apparently do not undergo addition: Kharasch and Zavist, J. Am Chem. Soc. 1951, 73, 964).

Monomers, such as styrene, acrylonitrile, methylacrylate or butadiene, in the presence of the conventional catalysts used for this process, such as peroxides or other sources of free radicals, yield with sulfonyl chloride polymers with the fragments of the sulfonyl chloride attached to each end of the chain, even when a very large excess of sulfonyl chloride is used.

According to the present invention adducts are obtained from vinylic or divinylic monomers and other olefins on the one hand, and aliphatic or aromatic substituted or unsubstituted sulfonyl chloride or di-sulfonyl chlorides on the other hand, if the reaction between the components is carried out in the presence of certain metal-compounds, which can serve as chlorine transfer agents, resulting in a specific activation of covalently bound chlorine ("redox-transfer": see J. Chem. Soc. 1963, 1887).

The reaction according to the present invention is effected in the presence of a chlorine transfer agent, such as a compound of iron or copper in either valency-state, in amounts varying between 0.1 and 10 mole percent, preferably between 0.5–3 mole percent, calculated on sulfonyl chloride. If necessary, cosolvents for said compounds and the other components of the reaction system, may be added (provided that the cosolvent is inert towards sulfonyl chloride), such as chloroform, methylene chloride, acetonitrile, and the like. The reaction is run between 50 and 200°, preferably between 70 and 120° C., and, if necessary, at elevated pressures, up to 300 atmospheres.

It is sometimes advantageous to carry out the reaction according to the present invention in the presence of chloride ions in addition to the metal compound. A convenient source of such chloride ions is a suitable salt inert towards sulfonyl chlorides and olefins, and soluble in the reaction medium, as for example an amine hydrochloride. Such a chloride imparts an increased solubility to the transition-metal salts, thereby making possible a wider choice of solvents. Suitable substituted ammonium chlorides include the following: methyl-, ethyl-, octyl-, lauryl-, octadecyl-, dimethyl-, diethyl-, dilauryl-, trimethyl-, triethyl-, trioctyl-, trilauryl-, or dilauryldimethyl ammonium chloride. They may be used in amounts varying between 10 mole percent and 10 moles, with respect to one mole of iron- or copper compound, preferably between 0.5 and 6 moles.

In contradistinction to existing methods of adding sulfonyl chloride to olefins, it has been found advantageous to use an excess of olefin or of vinylic monomer. Under these conditions the sulfonyl chloride is more fully converted, and excess olefin, which is recovered in a pure state, can be reused. In the case of monomers, no polymerization whatever takes place. If it is desired to use an excess of sulfonyl chloride, the latter can be recovered and reused. The molar ratio olefin to sulfonyl chloride may vary from 15:1 to 1:10, preferably from 8:1 to 1:5.

In certain cases improvements can be obtained, if in addition to a chlorine transfer agent as defined in J. Chem. Soc. 1963, 1887, preferably in its higher valency state, a suitable reducing agent is used, in order to give a steady supply of chlorine transfer agent in its lower valency state during the reaction.

Any convenient organic or inorganic reducing agent may be used, such as benzoin, hydroquinone, pyrogallol, benzaldehyde, acetone, 2,6-ditertiary butyl-4-methylphenol, 1- or 2-napthol, stannous chloride, soluble sulfites, dihydroanthracene, etc. Especially where the chlorine-transfer agents are iron-compounds, these reducing agents allow the process to be carried out at lower temperatures, thus ensuring more selective reactions and higher yields. The system ferric compound-reducing agent is especially fitting to give the lower telomers of olefins such as butadiene or other vinylic monomers, and sulfonyl chloride. The reducing agents may be used in amounts varying 3,441,614

TABLE I.—REACTION OF SULFONYL CHLORIDE (0.1 MOLE) WITH OLEFINS IN THE PRESENCE OF CATALYST, AND (IF INDICATED) AMINE HYDROCHLORIDE

| Number | Olefin | Molar Ratio[1] | Catalyst,[2] Mole Percent | Hydrochloride,[3] Mole Percent | Solvent, g. | Temp., °C. | Hours | Product | M.P. | Yield %++ | Note |
|---|---|---|---|---|---|---|---|---|---|---|---|
| | | | | BENZENE SULFONYL CHLORIDE | | | | | | | |
| 1 | Styrene | 1.1 | 1, A | | MeCn, 4 | 95–110 | 2 | $PhSO_2CH_2 \cdot CH(Cl)Ph$ | 89–90 | 86 | 1 |
| 2 | Butadiene | 2 | 1, A | | $CH_2Cl_2$, 15; MeCN, 2 | 100 | 4 | $PhSO_2CH_2 \cdot CH:CH \cdot CH_2Cl$ | | 94 | |
| 3 | Acrylonitrile | 2 | 1, A | | | 85–112 | 16 | $PhSO_2CH_2 \cdot CH(Cl) \cdot CN$ | 104–105 | 90 | 1,2 |
| 4 | do | 2 | 1, A | | | 85–90 | 20 | $PhSO_2CH_2 \cdot CH(Cl) \cdot CN$ | 104–105 | 20 | 1,2 |
| 5 | Ethylene | 7 | 3, A | | | 110 | 24 | $PhSO_2CH_2CH_2Cl$ | 53–54 | 97 | |
| 6 | Butene-1 | 2 | 1, A | | $CH_2Cl_2$, 20; MeCN, 2 | 100 | 24 | $PhSO_2CH_2 \cdot CH(Cl)C_2H_5$ | 39 | 86 | |
| 7 | do | 2 | 1, D | | $CH_2Cl_2$, 25; MeCN, 2 | 100 | 24 | $PhSO_2CH_2 \cdot CH(Cl)C_2H_5$ | 39 | 7 | 5,6 |
| 8 | do | 2 | 1, E | 4.5 | | 100 | 20 | $PhSO_2CH_2 \cdot CH(Cl)C_2H_5$ | 39 | 8 | 6 |
| 9 | do | 2 | 1, F | 3 | $CHCl_3$, 12; MeCN, 6 | 100 | 20 | $PhSO_2CH_2 \cdot CH(Cl)C_2H_5$ | 39 | 27 | |
| 10 | Butene-2 | 2 | 2, F | 1.5 | $CH_2Cl_2$, 15 | 100 | 20 | $PhSO_2CH(CH_3) \cdot CH(Cl) \cdot CH_3$ | | 51 | 5,6 |
| 11 | Vinyl Acetate | 2 | 5, C | 7.5 | $CH_2Cl_2$, 25; MeCN, 8 | 100 | 24 | $PhSO_2CH_2CH(Cl) (OCOCH_3)$ | | 70 | 4,6 |
| 12 | Vinyl Chloride | 2 | 3, A | 4.5 | MeCN, 8 | 100 | 10 | $PhSO_2CH_2 \cdot CHCl_2$ | 97 | 76 | 3 |
| 13 | Vinylidene Chloride | 2 | 3, A | 4.5 | $CH_2Cl_2$, 10; MeCN, 3 | 110 | 24 | $PhSO_2CH_2 \cdot CCl_3$ | 87.5 | 15 | 6 |
| 14 | Divinylbenzene | 0.5 | 4, A | 1.5 | MeCN, 10 | 110 | 24 | $p \text{-} C_6H_4(CHCl \cdot CH_2 \cdot SO_2Ph)_2$ | 72–73 | 15 | |
| | | | | | MeCN, 10 | 97 | 4 | | 107–200 | 17 | |
| | | | | p-CHLOROBENZENE SULFONYL CHLORIDE | | | | | | | |
| 15 | Styrene | 1.1 | 1, A | | MeCN, 4 | 95–110 | 2 | $p\text{-}ClC_6H_4SO_2CH_2 \cdot CH(Cl)Ph$ | 85 | 87 | 1 |
| 16 | Acrylonitrile | 2 | 1, A | | | 85–112 | 16 | $p\text{-}ClC_6H_4SO_2CH_2 \cdot CH(Cl)CN$ | 93–94 | 76 | 1,2 |
| 17 | do | 2 | 1, A | | | 85–92 | 20 | $p\text{-}ClC_6H_4SO_2CH_2 \cdot CH(Cl)CN$ | 93–94 | 15 | 1,2 |
| | | | | p-NITROBENZENE SULFONYL CHLORIDE | | | | | | | |
| 18 | Ethylene | 7 | 3, A | | $CH_2Cl_2$, 30; MeCN, 1 | 110 | 20 | $p\text{-}NO_2C_6H_4SO_2CH_2 \cdot CH_2Cl$ | 132–133 | 66 | 3 |
| | | | | METHANE SULFONYL CHLORIDE | | | | | | | |
| 19 | Butadiene | 2 | 0.5, A | | $CH_2Cl_2$, 15 | 82 | 20 | $CH_3SO_2CH_2 \cdot CH:CH \cdot CH_2Cl$ | 46–47 | 90 | |
| 20 | do | 2 | 1, A | | $CH_2Cl_2$, 15; MeCN, 1 | 100 | 4 | $CH_3SO_2CH_2 \cdot CH:CH \cdot CH_2Cl$ | 46–47 | 94 | |
| 21 | do | 2 | 1, A | | $CH_2Cl_2$, 10; MeCN, 10 | 100 | 8 | $CH_3SO_2CH_2 \cdot CH:CH \cdot CH_2Cl$ | 46–47 | 43 | |
| 22 | do | 2 | 1, B | | $CH_2Cl_2$, 15 | 100 | 20 | $CH_3SO_2CH_2 \cdot CH:CH \cdot CH_2Cl$ | 46–47 | 20 | |
| 23 | do | 2 | 2, C | | $CH_2Cl_2$, 15 | 100 | 20 | $CH_3SO_2CH_2 \cdot CH:CH \cdot CH_2Cl$ | 46–47 | 9 | 6 |
| 24 | do | 2 | 2, D | | $CH_2Cl_2$, 15; MeCN, 4 | 100 | 18 | $CH_3SO_2CH_2 \cdot CH:CH \cdot CH_2Cl$ | 46–47 | 46 | |
| 25 | do | 2 | 2, F | 3 | $CH_2Cl_2$, 15 | 82 | 10 | $CH_3SO_2CH_2 \cdot CH:CH \cdot CH_2Cl$ | 46–47 | 43 | 5,6 |
| 26 | Acrylonitrile | 4 | 1, A | 1.5 | | 100 | 8 | $CH_3SO_2CH_2 \cdot CH(Cl) \cdot CN$ | 74–75 | 70 | 3,5,6 |
| 27 | Methylacrylate | 4 | 1, A | 1.5 | MeCN, 3 | 110 | 24 | $CH_3SO_2CH_2 \cdot CH(Cl) \cdot CO_2CH_3$ | 60–61 | 71 | |
| | | | | β-CHLOROETHANE SULFONYL CHLORIDE | | | | | | | |
| 28 | Styrene | 1.2 | 1, A | | MeCN, 5 | 95–110 | 4 | $CH_2Cl \cdot CH_2SO_2CH_2 \cdot CH(Cl)Ph$ | | 93 | 3 |
| | | | | CHLOROMETHANE SULFONYL CHLORIDE | | | | | | | |
| 29 | Styrene | 2 | 1, A | | MeCN, 4 | 105 | 2 | $CH_2ClSO_2CH_2 \cdot CH(Cl)Ph$ | 84–85 | 60 | 1 |
| | | | | p-TOLUENE SULFONYL CHLORIDE | | | | | | | |
| 30 | Norbornadiene | 1 | 2, A | | MeCN, 12 | 82–86 | 3.5 |  | 168–159 | 44 | 1,3 |

[1] Molar ratio olefin: sulfonyl chloride. [2] Calculated on sulfonyl chloride. [3] Triethylamine hydrochloride is generally used, but can be replaced by any other soluble hydrochloride.

NOTES.—(1) Reaction under reflux. (2) Catalyst dissolved in acrylonitrile. (3) See examples. (4) Mixture of diastereoisomers. (5) 1 mole percent benzoin (calculated on sulfonyl chloride) is added; without benzoin, no reaction. Other reducing agents may be used, e.g., di-tert-butylmethylphenol, hydroquinone, naphthol, etc. (6) Unconverted sulfonyl chloride is recovered.

A: Cupric chloride. Cuprous chloride gives identical results.
B: Cupric stearate.
C: Cupric acetylacetonate.
D: Ferric chloride.
E: Ferrous chloride.
F: Ferric acetylacetonate.

between 0.1 to 10 moles with respect to chlorine-transfer agent, preferably between 0.3 and 2 moles. They may be added at the start of the reaction, or introduced gradually at reaction-temperature.

We are aware of D.B.P. 926,965 (of Apr. 28, 1955, Greune and Bicker, to Farbwerke Hoechst A.G.), according to which beta-chloroethyl sulfones are obtained by reacting ethylene and aryl sulfonyl chloride under the influence of Friedel-Crafts catalysts, which have to be used in roughly equimolar amounts calculated on sulfonyl chloride.

According to the present method, only very small quantities of catalyst are needed. These catalysts: hydrated ferric salts or ferrous salts, or other iron compounds, or hydrated or anhydrous cupric or cuprous salts or other copper compounds, are definitely not of the Friedel-Crafts type. By the new method high yields of pure adducts of ethylene and sulfonyl chloride are obtained.

A better and fuller understanding of the invention may be had by referring to Table I, and to the following examples, which are to be construed in an illustrative, and not in a restrictive sense, and by referring to the following claims.

Example 1

340 mg. (2 mmole) cupric chloride dihydrate and 412 mg. triethyl ammonium chloride are dissolved in 21.2 g. (0.4 mole) commercial acrylonitrile. 35.2 g. (0.2 mole) benzenesulfonyl chloride is added, and the mixture is refluxed for 16 hours. The initial temperature of the boiling mixture is 90° C. and after 16 hours, 112° C. While still hot, 50 ml. methanol is added, and the mixture left to crystallize with ice-cooling for 1 hour. The formed precipitate is sucked off, washed with ice-cold methanol, and dried in the air. 41 g. phenyl-$\alpha$-chlorocyanoethylsulfone is obtained as small crystals M.P. 104–105. (Yield: 90% of the theoretical.) Recrystallization from methanol does not change the melting point.

Example 2

10.8 g. (0.2 mole) butadiene are dissolved in a mixture of 12 g. methylene chloride and 11.5 g. (0.1 mole) methanesulfonyl chloride, which is cooled in an ice-salt mixture. The solution is introduced into a pre-cooled Carius tube. A solution of 67 mg. (0.5 mmole) anhydrous cupric chloride and 103 mg. (0.75 mmole) triethylammonium chloride in 3 g. methylene chloride is added. After displacing air by butadiene, the Carius tube is sealed, and heated at 82° C. for 20 hours. After cooling and opening of the Carius tube, its contents are freed from excess butadiene, washed with 1 N aqueous hydrochloric acid and with aqueous disodium dihydrogen ethylenediamine tetracetic acid (disodium versenate) until free from copper, and dried on calcium chloride. The solvent is evaporated in a film-evaporation apparatus in vacuo, finally at 80°. A pale yellow oil remains (15.2 g., 90% yield calculated on sulfonyl chloride), which solidifies completely to a white, hard mass.

The solid recrystallized from methanol, giving after washing with ice-cold methanol, and drying in the air, methyl-4-chloropent-2-enyl sulfone in white crystals, M.P. 46–47. The infrared absorption spectrum is in agreement with this structure.

Example 3

8.8 g. (0.05 mole) benzene sulfonyl chloride are added to a solution of 201 mg. (1.5 mmole) anhydrous cupric chloride and 308 mg. (2.25 mmole) triethylammonium chloride in 12 g. methylene chloride. The mixture is charged into a silver-lined autoclave, which is closed and connected with a cylinder containing ethylene. After purging, 5.6 g. ethylene are introduced. The autoclave is disconnected, heated at 115° C. for 24 hours, and then cooled to room temperature. During the reaction, the pressure falls from 73 to 68 atmospheres. After release of excess ethylene, the contents of the autoclave are twice washed with water, dried over calcium chloride, filtered, and freed from solvent by applying a vacuum, finally at 100° C. The residue (9.9 g.) solidifies completely to pale yellow crystals.

With the aid of charcoal, phenyl-$\beta$-chloroethyl sulfone is obtained in the form of white crystals of M.P. 53–54° C. (lit.=55–57° C., D.B.P. 926,965 of 28.4.1955).

In the same way, but using chloroform as the solvent, 4-nitrophenyl-$\beta$-chloroethyl sulfone (M.P. 131–132° C.; according to D.B.P. 887,505 of 24.8.1953: 129–130° C.) and 2-4-dinitrophenyl-$\beta$-chloroethyl sulfone (M.P. 114° C.; according to D.B.P. 887,505 of 24.8.1953: 112° C.) are obtained in good yields from the respective sulfonyl chlorides.

Similarly, 1,2,4-triazole-3-sulfonyl chloride and 6-methyluracil-5-sulfonyl chloride give with ethylene the respective $\beta$-chloroethylsulfones.

Example 4

402 mg. (3 mmole) anhydrous cupric chloride and 619 mg. (4.5 mmole) triethylammonium chloride are dissolved in 8 g. acetonitrile. 17.2 g. (0.2 mole) commercial, thoroughly dried, vinyl acetate and 17.6 g. (0.1 mole) benzene sulfonyl chloride are added, the resulting mixture is sealed in an ampoule under carbon dioxide, and heated at 100° for 18 hours. After cooling and opening of the ampoule, solvent and excess vinyl acetate are distilled off, finally in vacuo at 50°. The residue, which solidifies, is washed with ice-cold methanol. 18.3 g. slightly contaminated phenyl-$\beta$-chloro-$\beta$-acetoxyethylsulfone is obtained. (Yield: 70% of the theoretical.) After recrystallization from heptane, M.P. 97°.

Example 5

12.5 g. (0.2 mole) vinyl chloride are dissolved in a mixture of 10 g. methylene chloride and 17.6 g. (0.1 mole) benzene sulfonyl chloride, which is cooled in an ice-salt mixture. The solution is introduced into a pre-cooled Carius tube. A solution of 268 mg. (2 mmole) anhydrous cupric chloride and 412 mg. (3 mmole) triethylammonium chloride in 3 g. acetonitrile is added. Air in the Carius tube is displaced by vinyl chloride, and the tube is sealed and heated at 110° for 24 hours. After cooling and opening of the tube, excess vinyl chloride and the solvents are evaporated in vacuo, finally at 50°. The residue solidifies, and is washed with ice-cold methanol. 18.1 g. slightly impure phenyl-$\beta$-$\beta$-dichloroethyl sulfone is obtained (76% yield of the theoretical). After recrystallization from methanol, the melting point is 87.5°.

Example 6

16.3 g. (0.1 mole) $\beta$-chloroethane sulfonyl chloride and 12.5 g. (0.12 mole) styrene are refluxed for 4 hours in the presence of 134 mg. (1 mmole) anhydrous cupric chloride and 205 mg. (1.5 mmole) triethylammonium chloride, which are dissolved in 5 g. acetonitrile. The mixture is diluted with 20 ml. methylene chloride, washed successively with 1 N aqueous hydrochloric acid, water and an aqueous solution of disodium dihydrogen ethylenediamine-tetracetic acid (disodium dihydrogen versenate) until free from copper, dried on calcium chloride, and freed from solvents in vacuo, finally at 100°. 25 g. of a pale yellow oil remains, which is nearly pure $\alpha$-chlorophenylethyl-$\beta$-chloroethylsulfone, which can be purified by distillation under high vacuum. B.P. at $2.10^{-5}$ mm., 135°; $n_D^{25}$, 1.5642 (yield: 93%). Found: C, 45.13; H, 4.70; Cl, 25.95; S, 11.82. Calc. for $C_{10}H_{12}O_2Cl_2S$: C, 44.95; H, 4.53; Cl, 26.54; S, 12.0.

Dehydrohalogenation with triethylamine affords a crystalline derivative of the above adduct, the $\beta$-chloroethyl-styrylsulfone, M.P. 106°. Found: C, 51.96; H, 4.90. Calc. for $C_{10}H_{11}O_2ClS$: C, 52.05; H, 4.80.

Both the adduct and its dehydrohalogenate are strong vesicants, and should be handled with great care.

Example 7

2.3 g. (0.025 mole) norbornadiene and 4.75 g. (0.025 mole) p-toluene sulfonyl chloride are refluxed with 67 mg. (0.5 mmole) anhydrous cupric chloride and 103 mg. (0.75 mmole) triethylammonium chloride, dissolved in 3 g. acetonitrile, for 3.5 hours. After cooling, the mixture is diluted with methylene chloride, washed with 1 N aqueous hydrochloric acid and with an aqueous disodium dihydrogen versenate-solution until free from copper, dried on calcium chloride, and freed from solvent in vacuo, finally at 80°. The remaining paste is stirred with 5 ml. methanol, cooled in ice, sucked off and washed with ice-cold methanol. 3.1 g. of a white, crystalline powder is obtained, which after recrystallization from methanol gives pure 3-p-toluensulfonyl-5-chloro-nortricyclene, M.P. 158–159°. Yields: 44%.

Example 8

10.8 g. (0.2 mole) butadiene are dissolved in a mixture of 11.5 g. (0.1 mole) methane sulfonyl chloride, 706 mg. (2 mmole) ferric acetylacetonate, 212 mg. (1 mmole) benzoin and 15 g. methylene chloride. The resulting homogeneous solution is sealed in a Carius tube under 0.1 mm. pressure, and heated at 82° C. during 8 hours. After cooling and opening of the tube, its contents are washed with 5 N hydrochloric acid, and subjected to distillation, after drying on calcium chloride. 1.2 g. of B.P. 68–70° at 25 mm. pressure are collected, which consist of unconverted methane sulfonyl chloride and 4.8 g. of B.P. 126–146° at 0.15 mm. pressure, consisting of methyl-4-chlorobut-2-enyl sulfone (yield: 28% calc. on sulfonyl chloride). This fraction solidifies on cooling in ice. Recrystallization from methanol affords a pure product of M.P. 46–47°. The distillation residue is a mixture of low telomers of butadiene and methane sulfonyl chloride, containing mainly two and three butadiene-units on one sulfonyl chloride-unit.

Example 9

Into a cooled solution of 28.9 g. (0.1 mole) toluene-2,4-di-sulfonyl chloride in 15 g. methylene chloride are passed 13.5 g. (0.25 mole) butadiene. A solution of 134 mg. (1 mmole) anhydrous cupric chloride and 206 mg. (1.5 mmole) triethylammonium chloride in 2 g. acetonitrile is added and the resulting mixture is sealed in a Carius tube under 0.1 mm. pressure, and heated to 100° C. for 2 hours. After cooling, the contents of the tube are freed from catalyst by repeated washing with 1 N aqueous hydrochloric acid and aqueous disodium versenate. After drying on calcium chloride the solvent is evaporated in vacuo in a film-evaporator, finally at 50° C. A white solid remains (37.0 g.=93% yield), M.P. 116–119° C. After one recrystallization from methanol the M.P. of the pure toluene - 2,4 - bis - (4-chloro-pent-2-enyl)-sulfone is 123–124° C.

When ethane-1,2-di-sulfonyl chloride is used instead, a good yield of ethane-1,2-bis-(4-chloro-pent-2-enyl)-sulfone is obtained.

Example 10

To a mixture of 12.3 g. (0.05 mole) N-chlorosulfonyl-phthalimide and 11.2 g. (0.1 mole) octene-1 there is added a solution of 134 mg. (1 mmole) anhydrous cupric chloride and 206 mg. (1.5 mmole) triethylammonium chloride in 15 g. acetonitrile. The resulting mixture is sealed in a Carius tube under 0.1 mm. pressure and heated at 110° C. for 18 hours. After cooling the contents of the tube are diluted with methylene chloride and freed from catalyst as in the foregoing examples. After drying on calcium chloride, solvent and excess of octene are evaporated, leaving 9.1 g. of crude N-(2-chloro-n-octyl)-sulfonyl-phthalimide (yield 50% calculated on the sulfonyl chloride. After recrystallization from methanol, the melting point of the product is 98–99° C.

Having now particularly described and ascertained the nature of our said invention, and in what manner the same is to be performed, we declare, that we we claim is:

1. A process for the production of β-chloroorganosulfones by the 1,2-addition of an organic sulfonyl chloride to an olefinic compound in the presence of a catalytic amount of an iron compound.

2. The process as defined in claim 1, in which the organic sulfonyl chloride and olefinic compound reactants are admixed in molar ratios of from 15:1 to 1:5, and in the presence of from 0.1 to 1.0 mole percent of said iron compound, based on the amount of said organic sulfonyl chloride reactant.

3. The process as defined in claim 1, in which said organic sulfonyl chloride reactant is selected from the group consisting of methane sulfonyl chloride, chloromethane sulfonyl chloride, β-chloroethane sulfonyl chloride, ethane-1, 2-disulfonyl chloride, benzene sulfonyl chloride, p-chlorobenzene sulfonyl chloride, p-nitrobenzene sulfonyl chloride, 2,4-dinitrobenzene sulfonyl chloride, p-toluene sulfonyl chloride, toluene-2,4-disulfonyl chloride, 1,2,4-triazole-3-sulfonyl chloride, 6-methyluracil-5-sulfonyl chloride, and N-chlorosulfonyl-phthalimide.

4. The process as defined in claim 1, in which said olefinic compound reactant is selected from the group consisting of ethylene, butene-1, butene-2, octene 1, butadiene, vinyl acetate, vinyl chloride, vinylidene chloride, acrylonitrile, methyl acrylate, styrene, divinyl benzene, and norbornadiene.

5. The process as defined in claim 1, in which the addition reaction is carried out in a reaction medium containing said iron compound and, in addition thereto, a chloride salt which is soluble in the reaction medium and inert with respect to said organic sulfonyl chloride and olefinic compound reactants, said salt being added in an amount of from 10 mole percent to 10 moles per mole of said iron compound.

6. The process as defined in claim 5, in which the catalyst or chlorine transfer agent is a coordination-compound of iron.

7. The process as defined in claim 5, in which said chloride salt is an alkyl-substituted ammonium chloride, each of the organic substituents on said alkyl-substituted ammonium chloride having up to 12 carbon atoms.

8. The process for the production of β-chloroorganosulfone by the 1,2-addition of an organic sulfonyl chloride to an olefinic compound in the presence of a catalytic amount of an iron salt.

9. A process for the production of β-chloroorganosulfones by the 1,2-addition of an organic sulfonyl chloride to an olefinic compound in the presence of a catalytic amount of a copper compound and, in addition thereto, a chloride salt which is soluble in the reaction medium and inert with respect to said organic sulfonyl chloride and olefinic compound reactants, said salt being added in an amount of from 10 mole percent to 10 moles per mole of said copper compound.

10. The process as defined in claim 9, in which the catalyst or chlorine transfer agent is a coordination-compound of copper.

11. The process as defined in claim 9, in which said chloride salt is an alkyl-substituted ammonium chloride, each of the organic substituents on said alkyl-substituted ammonium chloride having up to 12 carbon atoms.

12. The process as defined in claim 9, in which the organic sulfonyl chloride and olefinic compound reactants are admixed in molar ratios of from 15:1 to 1:5, and in the presence of from 0.1 to 10.0 mole percent of said copper compound, based on the amount of said organic sulfonyl chloride present.

13. The process as defined in claim 9, in which said organic sulfonyl chloride reactant is selected from the group consisting of methane sulfonyl chloride, chloromethane sulfonyl chloride, β-chloroethane sulfonyl chloride, ethane-1, 2-disulfonyl chloride, benzene sulfonyl chloride, p-chlorobenzene sulfonyl chloride, p-nitrobenzene sulfonyl chloride, 2,4-dinitrobenzene sulfonyl chloride, p-toluene sulfonyl chloride, toluene-2,4-disulfonyl chloride, 1,2,4-triazole-3-sulfonyl chloride, 6-methyluracil-5-sulfonyl chloride, and N-chlorosulfonyl-phthalimide.

14. The process as defined in claim 9, in which said olefinic compound reactant is selected from the group consisting of ethylene, butene-1, butene-2, octene-1, butadiene, vinyl acetate, vinyl chloride, vinylidene chloride, acrylonitrile, methyl acrylate, styrene, divinyl benzene, and norbornadiene.

References Cited

UNITED STATES PATENTS

| 3,262,964 | 7/1966 | Rust et al. | 260—607 |
| 3,267,150 | 8/1966 | Moore et al. | 260—607 |

CHARLES B. PARKER, Primary Examiner.

D. R. PHILLIPS, Assistant Examiner.

U.S. Cl. X.R.

260—465, 465.7, 470, 326, 397.6, 260, 308, 491